United States Patent [19]
Thomas

[11] Patent Number: 5,398,994
[45] Date of Patent: Mar. 21, 1995

[54] VEHICLE PNEUMATIC SEAT LIFT APPARATUS

[76] Inventor: Raymond M. Thomas, 2541 Wayland Rd., Berwyn, Pa. 19312

[21] Appl. No.: 205,072

[22] Filed: Mar. 3, 1994

[51] Int. Cl.⁶ .............................................. A61G 15/00
[52] U.S. Cl. ............................ 297/335; 297/DIG. 3; 297/DIG. 10; 5/453; 5/454
[58] Field of Search ........ 297/335, DIG. 10, DIG. 3, 297/330; 5/449, 453, 454, 509; 254/93 HP

[56] References Cited

U.S. PATENT DOCUMENTS

| | | | |
|---|---|---|---|
| 2,644,449 | 7/1953 | Champagne | 254/93 HP |
| 4,629,162 | 12/1986 | Porche | 5/453 X |
| 4,905,329 | 3/1990 | Heilner | 297/DIG. 10 X |
| 4,998,301 | 3/1991 | Markus | 5/454 X |

FOREIGN PATENT DOCUMENTS 34960 9/1981 European Pat. Off. ...... 297/DIG. 3

Primary Examiner—Laurie K. Cranmer

[57] ABSTRACT

First and second plate members mounted upon a vehicle seat include a selectively inflated pneumatic chamber positioned therebetween, whereupon actuation of a remote pneumatic pump effects inflation of the chamber, thereby pivoting the first plate relative to the second plate to enhance a directing of an individual from the vehicle seat.

6 Claims, 2 Drawing Sheets

VEHICLE PNEUMATIC SEAT LIFT APPARATUS

BACKGROUND OF THE INVENTION

1. Field of the Invention

The field of invention relates to vehicle seat structure, and more particularly pertains to a new vehicle pneumatic seat lift apparatus wherein the same is arranged to enhance ease of access within a vehicle relative to the vehicle seat.

2. Description of the Prior Art

Individuals of limited physical capacity such as aged individuals or individuals having back and/or leg injuries have suffered a degree of difficulty in the entrance and the egress relative to an associated automotive vehicle and seat.

Vehicle seats in the prior art have been typically related to the manner of positioning of the seat as indicated in U.S. Pat. No. 5,040,832 providing a vehicle seat structure having a seat mechanism and more particularly to a cushion mounted to a gear rack arranged for lifting to enhance the ease of manipulation of an individual relative to the vehicle seat.

The instant invention attempts to overcome deficiencies of the prior art by providing for a pivoted plate structure arranged to selectively lift and support an individual relative to the vehicle seat and in this respect, the present invention substantially fulfills this need.

SUMMARY OF THE INVENTION

In view of the disadvantages inherent in the known types of vehicle seat lift structure now present in the prior art, the present invention provides a vehicle pneumatic seat lift apparatus wherein the same is arranged to permit the ease of access to and egress from an associated vehicle seat within an automotive vehicle.

To attain this, the present invention provides first and second plate members which may be mounted upon a vehicle seat and include a selectively inflated pneumatic chamber positioned therebetween, whereupon actuation of a remote pneumatic pump effects inflation of the chamber, thereby pivoting the first plate relative to the second plate to enhance a directing of an individual from the vehicle seat.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is an object of the present invention to provide a new vehicle pneumatic seat lift apparatus which may be easily and efficiently manufactured and marketed.

It is a further object of the present invention to provide a new vehicle pneumatic seat lift apparatus which is of a durable and reliable construction.

An even further object of the present invention is to provide a new vehicle pneumatic seat lift apparatus which is susceptible of a low cost of manufacture with regard to both materials and labor, and which accordingly is then susceptible of low prices of sale to the consuming public, thereby making such vehicle pneumatic seat lift apparatus economically available to the buying public.

Still yet another object of the present invention is to provide a new vehicle pneumatic seat lift apparatus which provides in the apparatuses and methods of the prior art some of the advantages thereof, while simultaneously overcoming some of the disadvantages normally associated therewith.

Even still yet another object of the present invention is to provide a new vehicle pneumatic seat lift apparatus which comprises first and second plate members having a selectively inflated pneumatic chamber positioned therebetween, whereupon actuation of a remote pneumatic pump effects inflation of the chamber, thereby pivoting the first plate relative to the second plate to enhance a directing of an individual from the vehicle seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
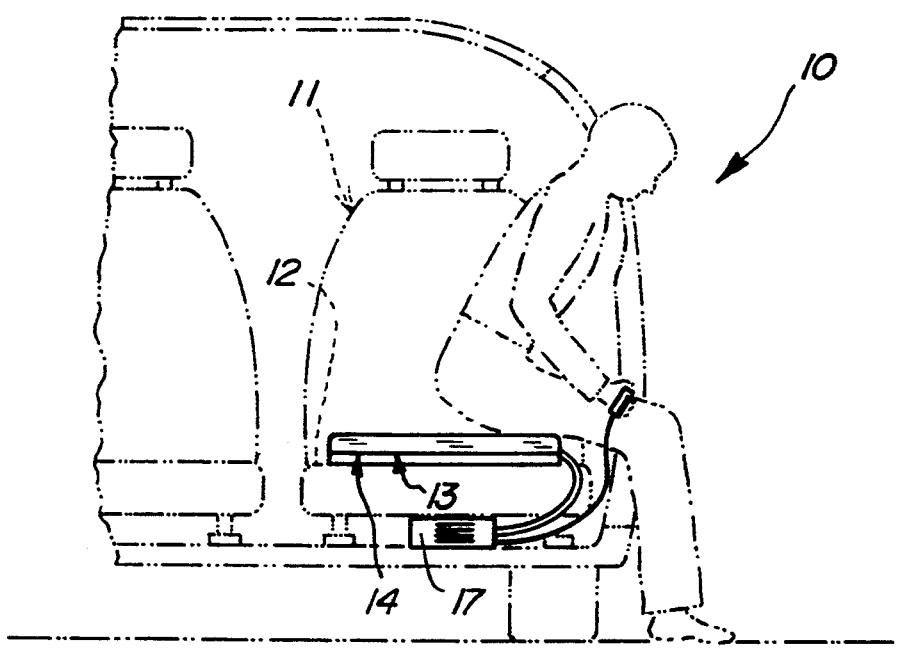
FIG. 1 is an orthographic view of the invention in a first position.

With reference now to the drawings, and in particular to FIGS. 1-4 thereof, a new vehicle pneumatic seat lift apparatus embodying the principles and concepts of the present invention and generally designated by the reference numeral 10 will be described.

Figure 2:
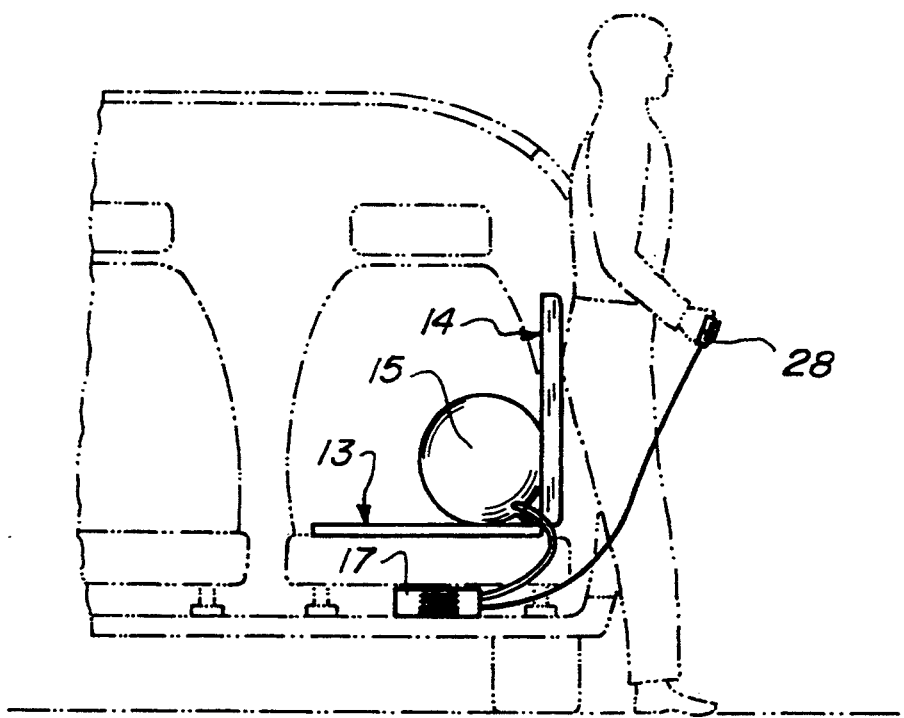
FIG. 2 is an orthographic view of the invention in a second position.
Figure 3:
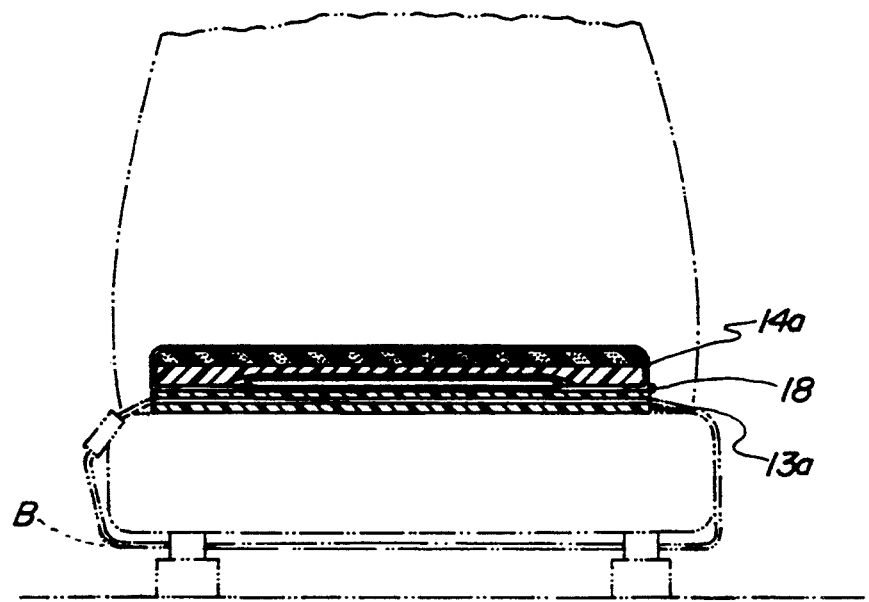
FIG. 3 is an orthographic cross-sectional illustration of the first and second plate structure in the first position.

More specifically, the vehicle pneumatic seat lift apparatus 10 of the instant invention may be mounted to a vehicle seat 11 having a base portion 12. The invention 10 comprises a first plate 13 arranged for positioning upon the base portion 12 of the vehicle seat 11, and a second plate 14 pivotally mounted to the first plate 13. The first plate includes a belt member "B" extending from the first plate 13 about the lower seat cushion to permit sliding adjustment of the seat in a conventional manner, as shown in FIG. 3. The first plate 13 has a first plate hinge side 13a, and the second plate 14 has a second plate hinge side 14a, with the first and second plate hinge sides having a hinge 18 secured therebetween to permit a pivoting of the apparatus 10 from a first position, as indicated in FIG. 1 when the first and second plates are substantially parallel relative to one another, to a second position when the first and second plates are oriented at an oblique included angle relative to one another. This pivoting of the second plate 14 to the second position effects lifting of an individual from the passenger compartment relative to the base portion 12 of the seat 11, as shown in FIG. 2. Conversely, the individual may also ease into the vehicle through a pivoting of the second plate 14 to the first position.

Figure 4:
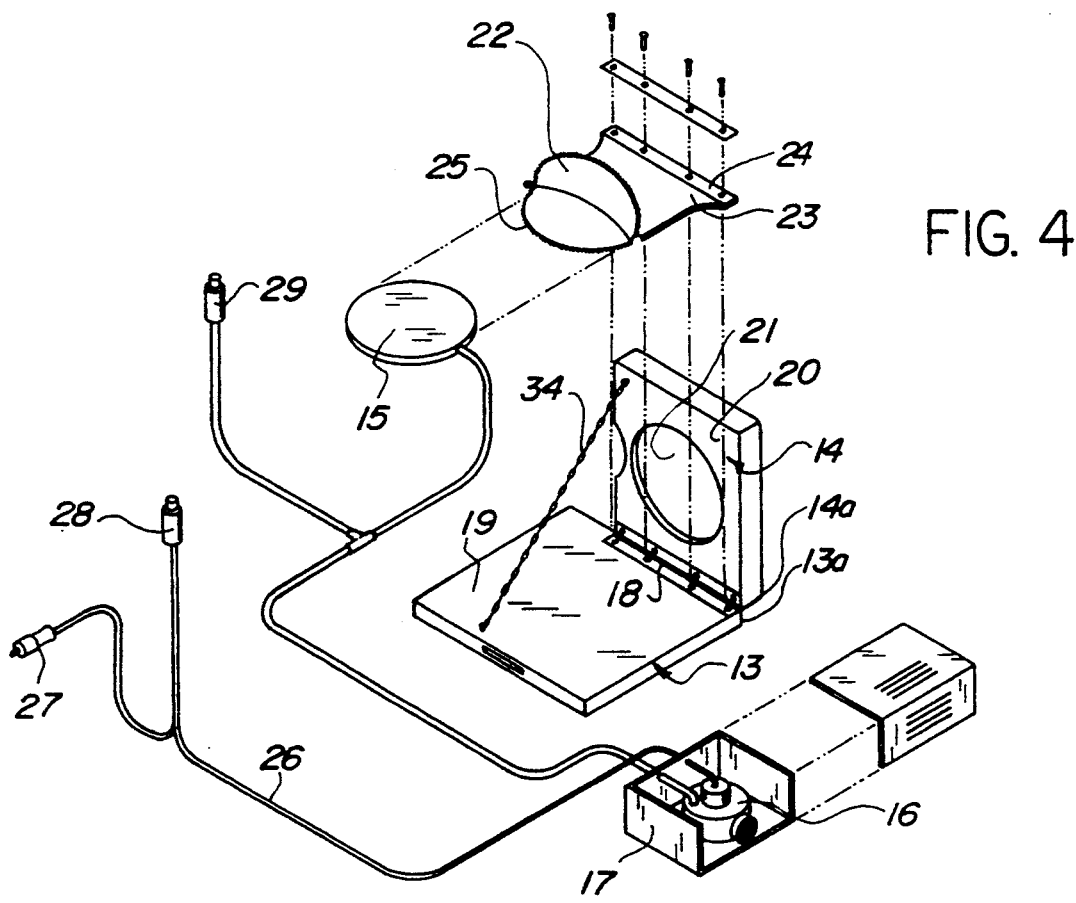
FIG. 4 is an isometric exploded view of the invention separated from the associated vehicle seat.

To effect pivoting of the plates 13, 14 relative on to the other, the apparatus 10 includes a pneumatic chamber 15 in pneumatic communication with a pneumatic pump 16 contained within a pump housing 17 positioned below or spaced from the vehicle seat 11. The pneumatic chamber 15 is received within a pocket 22 mounted to a support web 23 of flexible construction, that in turn is coupled to an elongate plate 24 secured to the hinge 18. A zipper 25 mounted to the pocket permits a selective removal of the pneumatic chamber 15, whereupon securement of the pneumatic chamber within the pocket 22 by closure of the zipper 25 prevents inadvertent removal of the pneumatic chamber structure. Further, the second plate bottom wall 20 is arranged in a facing relationship relative to a first plate top wall 19, with the bottom wall 20 including a recess 21 for receiving the pocket 22 and pneumatic chamber 15 therewithin to permit the contiguous positioning of the first plate top wall 19 and the second plate bottom wall 20 when in the first position. A tether cord extends between the first plate top wall 19 and the second plate bottom wall 20 to prevent undue displacement of the second plate bottom wall relative to the first plate top wall, as shown in FIG. 4.

To provide electrical power to the pump 16, a power supply cord 26 is directed to the pump 16 and extends to a connector 27 for typical mounting within a vehicle dashboard cigarette lighter or otherwise to be wired within the vehicle electrical system. An on/off switch 27 permits selective, remote actuation of the pump 16 within the housing 17. A manually operative air valve 29 is arranged to permit selective deflation of the pneumatic chamber 15, thereby returning the apparatus 10 to the first position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle pneumatic seat lift apparatus for use with a vehicle seat having a base portion, the apparatus comprising:

a first plate having a first plate hinge side and a first plate top wall, said first plate being arranged for mounting upon said base portion;

a second plate having a second plate hinge side and a second plate bottom wall, said second plate bottom wall having a recess directed into said second plate bottom wall;

a hinge for pivotally coupling said first plate hinge side to said second plate hinge side and permitting a pivoting of said first plate relative to said second plate, such that the second plate bottom wall is in contiguous communication with the first plate top wall in a first position, and the second plate bottom wall is displaced relative to the first plate top wall in a second position;

a pneumatic chamber mounted within said recess, said recess permitting said pneumatic chamber to reside therewithin, thereby permitting a contiguous positioning of said first plate top wall against said second plate bottom wall when said apparatus is in said first position;

a pneumatic pump, the pneumatic pump including an on/off switch and a power supply means for coupling the pump to a power source, with the pneumatic pump arranged in a remote, separated orientation relative to the pneumatic chamber; and, a pneumatic conduit in pneumatic communication with the pneumatic pump and the pneumatic chamber.

2. An apparatus as set forth in claim 1, and further including a valve member in pneumatic communication with the pneumatic chamber to permit selective, release of air pressure within the pneumatic chamber.

3. An apparatus as set forth in claim 2, and further including a pocket member, the pocket member including a zipper arranged to selectively encompass the pneumatic chamber, and the pocket having a flexible support web, with a plate mounted to the support web spaced from the pocket, and the plate being mounted to the hinge between the first plate and the second plate.

4. An apparatus as set forth in claim 3, and further including a tether cord mounted between the first plate top wall and the second plate bottom wall to limit pivoting of the second plate relative to the first plate.

5. A vehicle pneumatic seat lift apparatus for use with a vehicle seat having a base portion, the apparatus comprising:

a first plate having a first plate hinge side and a first plate top wall, said first plate being arranged for mounting upon said base portion;

a second plate having a second plate hinge side and a second plate bottom wall, said second plate bottom wall having a recess directed into the second plate;

a hinge for pivotally coupling said first plate hinge side to said second plate hinge side and permitting a pivoting of said first plate relative to said second plate, such that the second plate bottom wall is in contiguous communication with the first plate top wall in a first position, and the second plate bottom wall is displaced relative to the first plate top wall in a second position;

a pneumatic chamber mounted within said recess;

a pneumatic pump, the pneumatic pump including an on/off switch and a power supply means for coupling the pump to a power source, with the pneumatic pump arranged in a remote, separated orientation relative to the pneumatic chamber;

a pneumatic conduit in pneumatic communication with the pneumatic pump and the pneumatic chamber;

a valve member in pneumatic communication with the pneumatic chamber to permit selective release of air pressure within the pneumatic chamber; and, a pocket member, the pocket member including a zipper arranged to selectively encompass the pneumatic chamber, and the pocket having a flexible support web, with a plate mounted to the support web spaced from the pocket, and the plate being mounted to the hinge between the first plate and the second plate.

6. An apparatus as set forth in claim 5, and further including a tether cord mounted between the first plate top wall and the second plate bottom wall to limit pivoting of the second plate relative to the first plate.

* * * * *